US012255008B2

(12) United States Patent
Nakashima et al.

(10) Patent No.: US 12,255,008 B2
(45) Date of Patent: Mar. 18, 2025

(54) INDUCTOR COMPONENT

(71) Applicant: Murata Manufacturing Co., Ltd., Kyoto-fu (JP)

(72) Inventors: Yasunari Nakashima, Nagaokakyo (JP); Shinya Tajima, Nagaokakyo (JP); Yuta Shimoda, Nagaokakyo (JP); Daisuke Takahashi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 18/601,691

(22) Filed: Mar. 11, 2024

(65) Prior Publication Data

US 2024/0221996 A1 Jul. 4, 2024

Related U.S. Application Data

(63) Continuation of application No. 16/927,923, filed on Jul. 13, 2020, now Pat. No. 12,020,846.

(30) Foreign Application Priority Data

Aug. 7, 2019 (JP) ................................ 2019-145553

(51) Int. Cl.
*H01F 27/29* (2006.01)
*H01F 17/00* (2006.01)

(52) U.S. Cl.
CPC ....... *H01F 27/292* (2013.01); *H01F 17/0013* (2013.01)

(58) Field of Classification Search
CPC ........................... H01F 27/292; H01F 17/0013
See application file for complete search history.

(56) References Cited

U.S. PATENT DOCUMENTS

| | | | | |
|---|---|---|---|---|
| 2010/0219925 A1 | 9/2010 | Yamamoto et al. | | |
| 2012/0188040 A1* | 7/2012 | Ogawa | H01F 27/027 | 336/83 |
| 2016/0012961 A1* | 1/2016 | Suzuki | H01F 27/29 | 29/602.1 |

(Continued)

FOREIGN PATENT DOCUMENTS

| | | |
|---|---|---|
| CN | 102610363 A | 7/2012 |
| CN | 107230542 A | 10/2017 |

(Continued)

OTHER PUBLICATIONS

An Office Action mailed by China National Intellectual Property Administration on Dec. 3, 2021 which corresponds to Chinese Patent Application No. 202010668493.1 and is related to U.S. Appl. No. 16/927,923 with English language translation.

(Continued)

*Primary Examiner* — Malcolm Barnes
(74) *Attorney, Agent, or Firm* — Studebaker Brackett PLLC

(57) ABSTRACT

An inductor component includes an element body, a coil provided in the element body, and an outer electrode provided to the element body and electrically connected to the coil. The outer electrode includes an underlying layer embedded in the element body in which part of the underlying layer protrudes from a surface of the element body, and a coating film that covers a portion of the underlying layer exposed at the element body.

19 Claims, 7 Drawing Sheets

(56) References Cited

U.S. PATENT DOCUMENTS

| | | | | |
|---|---|---|---|---|
| 2016/0141102 | A1* | 5/2016 | Tseng | H01F 27/292 336/200 |
| 2017/0004918 | A1* | 1/2017 | Kido | H01F 27/292 |
| 2017/0133146 | A1* | 5/2017 | Lee | H01F 41/042 |
| 2017/0278624 | A1 | 9/2017 | Ogino et al. | |
| 2018/0082775 | A1* | 3/2018 | Shimoichi | H01F 27/327 |
| 2018/0286566 | A1 | 10/2018 | Aoki et al. | |
| 2018/0366248 | A1* | 12/2018 | Maruyama | H01F 27/292 |
| 2018/0374621 | A1* | 12/2018 | Sekiguchi | H01F 27/292 |
| 2019/0066912 | A1* | 2/2019 | Takeda | H01F 27/323 |
| 2019/0304666 | A1 | 10/2019 | Arai et al. | |
| 2019/0333686 | A1* | 10/2019 | Kazuta | H01F 27/292 |

FOREIGN PATENT DOCUMENTS

| | | | | |
|---|---|---|---|---|
| CN | 108695038 A | 10/2018 | | |
| CN | 109427459 A | 3/2019 | | |
| JP | 2002-252124 A | 9/2002 | | |
| JP | 2009-206110 A | 9/2009 | | |
| JP | 2012-104745 A | 5/2012 | | |
| JP | 2012-156477 A | 8/2012 | | |
| JP | 2015-015297 A | 1/2015 | | |
| JP | 2017-174970 A | 9/2017 | | |
| JP | 2018-046257 A | 3/2018 | | |
| JP | 2019-046936 A | 3/2019 | | |
| JP | 2019-176109 A | 10/2019 | | |
| WO | WO-2018116665 A1 | * | 6/2018 | H01F 17/0013 |

OTHER PUBLICATIONS

An Office Action; "Notice of Reasons for Refusal," mailed by the Japanese Patent Office on Mar. 29, 2022, which corresponds to Japanese Patent Application No. 2019-145553 and is related to U.S. Appl. No. 16/927,923 with English language translation.

* cited by examiner

INDUCTOR COMPONENT

CROSS-REFERENCE TO RELATED APPLICATION

This application is a Continuation of U.S. patent application Ser. No. 16/927,923 filed Jul. 13, 2020, which claims benefit of priority to Japanese Patent Application No. 2019-145553, filed Aug. 7, 2019, the entire content of which is incorporated herein by reference.

BACKGROUND

Technical Field

The present disclosure relates to an inductor component.

Background Art

An inductor component is described in Japanese Unexamined Patent Application Publication No. 2015-15297. The inductor component includes an element body, a coil provided in the element body, and an outer electrode provided to the element body and electrically connected to the coil. The outer electrode includes an underlying layer embedded in the element body, and a coating film covering the underlying layer.

As for the inductor component in the related art, since the underlying layer is positioned on the cut line in the manufacturing stage, the exposed surface of the underlying layer exposed at the element body after being divided into individual components is positioned on the same plane as the surface of the element body. Subsequently, the coating film is formed on the exposed surface of the underlying layer by a plating process. Thus, the coating film is formed on the exposed surface of the underlying layer positioned on the same plane as the surface of the element body.

In recent years, the inductor component has been reduced in size, and in consideration of the reduction in size of the inductor component, the inventors of the present application have found that there is a possibility that the fixing force of the coating film to the underlying layer is insufficient in the related art.

SUMMARY

Accordingly, the present disclosure provides an inductor component in which the fixing force of a coating film to an underlying layer is improved.

An inductor component according to an aspect of the present disclosure includes an element body, a coil provided in the element body, and an outer electrode provided to the element body and electrically connected to the coil. The outer electrode includes an underlying layer embedded in the element body such that part of the underlying layer protrudes from a surface of the element body, and a coating film that covers a portion of the underlying layer exposed at the element body.

According to the aspect above, since part of the underlying layer protrudes from the surface of the element body and the coating film covers the protruding underlying layer, the area in which the coating film is in contact with the underlying layer may be increased, and the fixing force of the coating film to the underlying layer is improved. In addition, when the inductor component is mounted on a mounting substrate, since the surface area of the coating film increases, the contact area with solder may be increased and the fixing force of the inductor component to the mounting substrate is improved.

Other features, elements, characteristics and advantages of the present disclosure will become more apparent from the following detailed description of preferred embodiments of the present disclosure with reference to the attached drawings.

DETAILED DESCRIPTION

Hereinafter, an inductor component according to an aspect of the present disclosure is described in detail with reference to the illustrated embodiments. Note that the drawings include some schematic drawings, and the actual dimensions and ratios may not be reflected in some cases.

First Embodiment

Structure

Figure 1:
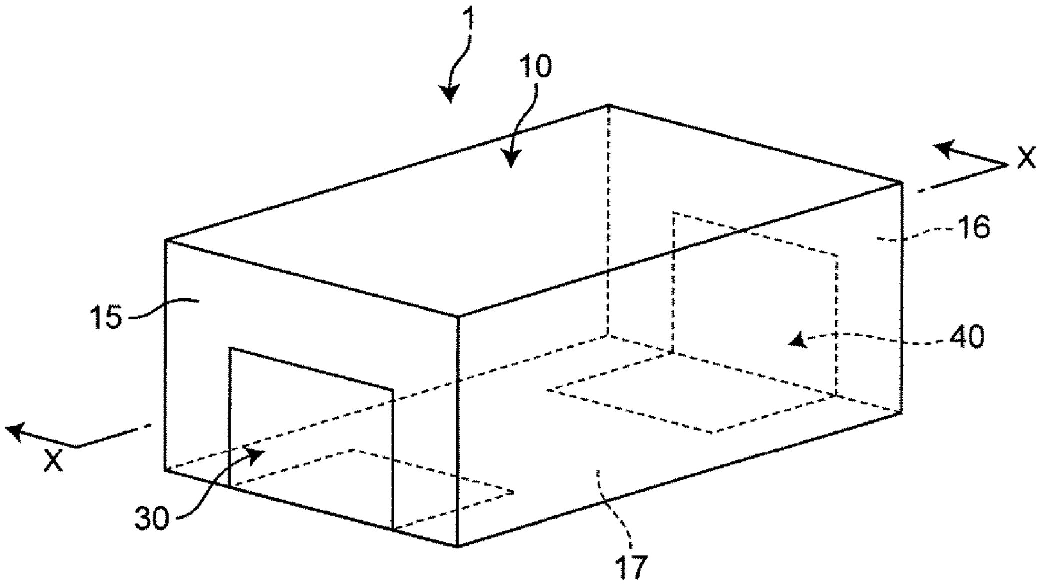
FIG. 1 is a perspective view illustrating a first embodiment of an inductor component.
Figure 2:
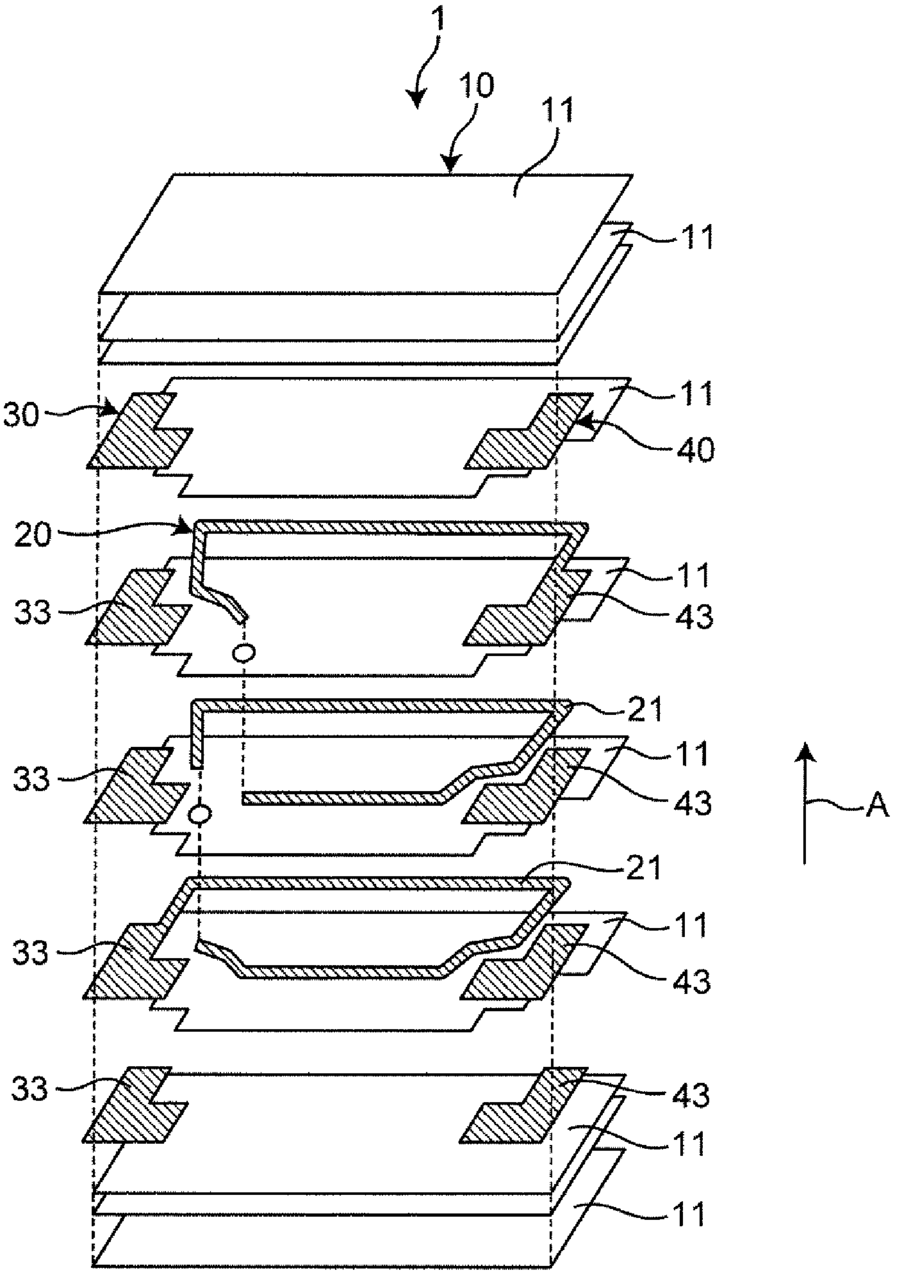
FIG. 2 is an exploded perspective view of the inductor component.
Figure 3A:
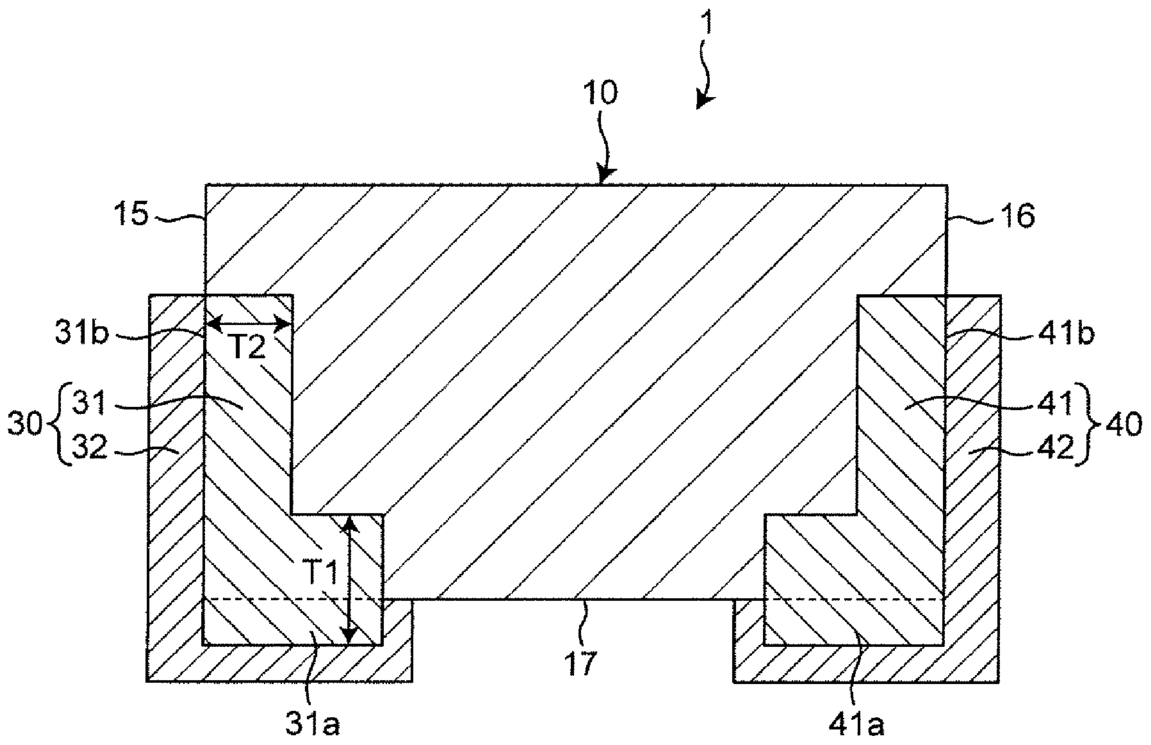
FIG. 3A is a sectional view of the inductor component taken along line X-X.
Figure 4:
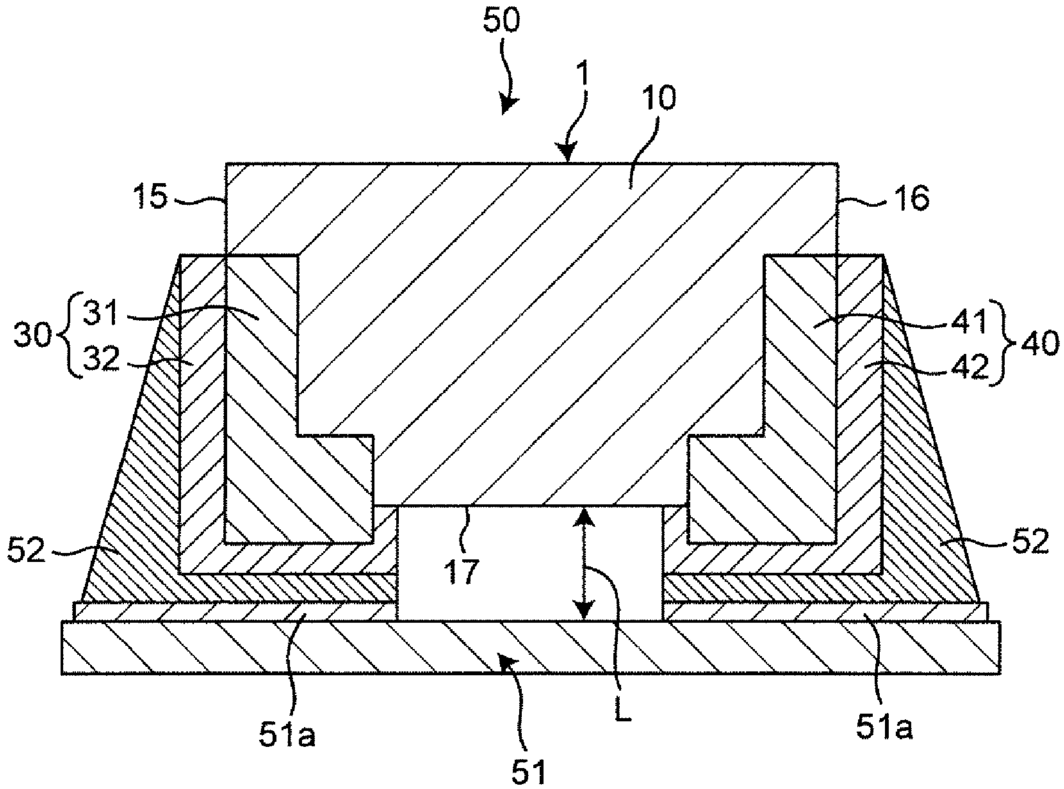
FIG. 4 is a sectional view illustrating a state in which the inductor component is mounted on a mounting substrate.

FIG. 1 is a perspective view illustrating a first embodiment of an inductor component. FIG. 2 is an exploded perspective view of the inductor component. FIG. 3A is a sectional view of FIG. 1 taken along line X-X. FIG. 4 is a sectional view illustrating a state in which the inductor component is mounted on a mounting substrate. As illustrated in FIG. 1, FIG. 2, and FIG. 3A, an inductor component 1 includes an element body 10, a coil 20 in a spiral shape provided inside the element body 10, and a first outer electrode 30 and a second outer electrode 40 which are provided to the element body 10 and electrically connected to the coil 20. In FIG. 3A, illustration of the coil 20 is omitted.

As illustrated in FIG. 4, the inductor component 1 (first outer electrode 30 and second outer electrode 40) is electrically connected, with solder 52, to a wire 51*a* of a mounting substrate 51. The inductor component 1 is used as, for example, an impedance matching coil (matching coil) in a high frequency circuit, and is used in an electronic device such as a personal computer, a DVD player, a digital camera, a TV, a cellular phone, a car electronics, and a medical/industrial machine. However, the application of the inductor component 1 is not limited to the above and includes, for example, a tuning circuit, a filter circuit, a rectifying and smoothing circuit, or the like.

The element body 10 is formed by laminating a plurality of insulating layers 11 in a lamination direction A. Each insulating layer 11 is made of, for example, a material containing borosilicate glass as a main component, or a material such as ferrite or resin. Note that, in the element body 10, the interface between the plurality of insulating layers 11 may be not clear due to firing or the like in some cases. The element body 10 is formed as a substantially rectangular parallelepiped. The surface of the element body 10 has a first end surface 15 and a second end surface 16 opposite to each other in the longitudinal direction of the rectangular parallelepiped, and has a bottom surface 17 intersecting with the first end surface 15 and the second end surface 16 and corresponding to one of the two surfaces opposite to each other in the height direction of the rectangular parallelepiped. The first end surface 15 and the second end surface 16 are opposite to each other in a direction orthogonal to the lamination direction A of the insulating layers 11. The first end surface 15 is a surface on which part of the first outer electrode 30 is provided, and the second end surface 16 is a surface on which part of the second outer electrode 40 is provided. The bottom surface 17 is a surface that faces the mounting substrate 51 at the time of mounting. The bottom surface 17 is a surface at which both of the other part of the first outer electrode 30 and the other part of the second outer electrode 40 are provided.

The first outer electrode 30 has an L-shape extending across the first end surface 15 and the bottom surface 17. The second outer electrode 40 has an L-shape extending across the second end surface 16 and the bottom surface 17. The first outer electrode 30 includes a plurality of outer electrode conductor layers 33 embedded in the element body 10. The second outer electrode 40 includes a plurality of outer electrode conductor layers 43 embedded in the element body 10.

Each outer electrode conductor layer 33 included in the first outer electrode 30 has an L-shape including a portion extending along the first end surface 15 and the bottom surface 17, and each outer electrode conductor layer 43 included in the second outer electrode 40 has an L-shape including a portion extending along the second end surface 16 and the bottom surface 17. With this, since the first outer electrode 30 and the second outer electrode 40 are able to be embedded in the element body 10, it is possible to reduce the size of the inductor component compared with a configuration in which the outer electrode is externally attached to the element body 10. Further, since the coil 20, the first outer electrode 30, and the second outer electrode 40 are able to be formed in the same process, variations in the positional relationship among the coil 20, the first outer electrode 30, and the second outer electrode 40 may be reduced, and it is thus possible to reduce variations in the electrical characteristics of the inductor component 1.

The coil 20 is formed of, for example, a conductive material similar to the outer electrode conductor layer 33 of the first outer electrode 30 and the outer electrode conductor layer 43 of the second outer electrode 40. The coil 20 is spirally wound along the lamination direction A of the insulating layers 11. That is, the axis of the coil 20 is parallel to the bottom surface 17 parallel to the lamination direction A, and the coil 20 has a lateral winding structure when mounted on the mounting substrate 51. The axis of the coil 20 means the central axis of the spiral shape of the coil 20. One end of the coil 20 is in contact with the first outer electrode 30, and the other end of the coil 20 is in contact with the second outer electrode 40. Note that, in the present embodiment, the coil 20 and the first and second outer electrodes 30 and 40 are integrated and there is no clear boundary therebetween. However, not being limited to this, a boundary may exist when the coil and the outer electrodes are formed by different kinds of materials or different types of processes.

The coil 20 includes a plurality of coil conductor layers 21 wound on the insulating layers 11. Thus, since the coil 20 is formed of the coil conductor layers 21 that may be finely processed, it is possible to achieve reduction in size and reduction in height of the inductor component 1. The coil conductor layers 21 adjacent to each other in the lamination direction A are connected to each other through a via conductor extending through the insulating layers 11 in the thickness direction. That is, one end of the one coil conductor layer 21 is connected to the other end of other coil conductor layer 21. Thus, the plurality of coil conductor layers 21 constitute a spiral while being connected to each other. Specifically, the coil 20 has a configuration in which the plurality of coil conductor layers 21 each of which has the number of turns less than one are connected to each other and are laminated, and the coil 20 has a helical shape. With this, the parasitic capacitance generated in the coil conductor layer 21 and the parasitic capacitance generated between the coil conductor layers 21 may be reduced, and the Q factor of the inductor component 1 may be improved. Note that the number of turns of the coil conductor layer 21 may be one or more.

As illustrated in FIG. 3A, the first outer electrode 30 includes an underlying layer 31 and a coating film 32. The underlying layer 31 corresponds to the outer electrode conductor layers 33 in FIG. 2, and illustration of the coating film 32 is omitted in FIG. 2.

The underlying layer 31 is embedded in the element body 10 such that part of the underlying layer 31 protrudes from the surface of the element body 10. That is, part of the underlying layer 31 (protruding portion 31*a*) protrudes from the bottom surface 17 of the element body 10.

The underlying layer 31 does not protrude from the first end surface 15 of the element body 10 and is exposed. That is, one surface 31*b* of the underlying layer 31 is positioned on the same plane as the first end surface 15 of the element body 10. In other words, the underlying layer 31 does not protrude from the surface other than the bottom surface 17 of the element body 10. The exposure of the underlying layer 31 at the element body 10 means that the underlying layer 31 has a portion that is not covered by the element body 10, and the portion may be exposed to the outside of the inductor component 1 or may be exposed to another member.

Figure 3B:
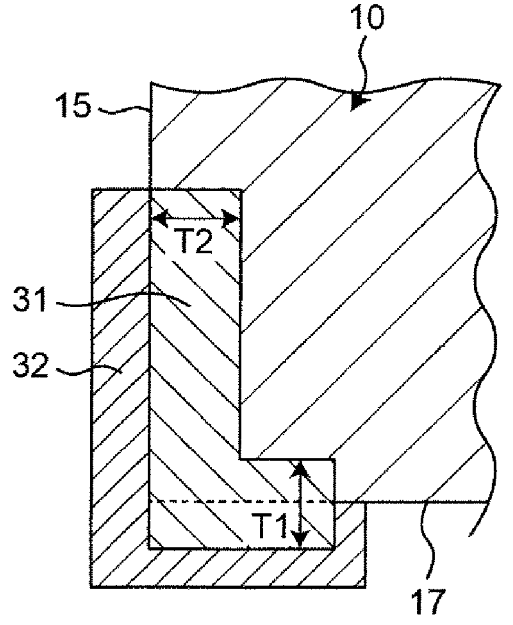
FIG. 3B is a sectional view illustrating another embodiment of an underlying layer.

A thickness T1 of the underlying layer 31 at the bottom surface 17 is larger than a thickness T2 of the underlying layer 31 at the first end surface 15. The thickness T1 of the underlying layer 31 at the bottom surface 17 is, in the cross-section of FIG. 3A, the thickness of the portion of the underlying layer 31 positioned at the bottom surface 17 in a direction orthogonal to the bottom surface 17. Similarly, the thickness T2 of the underlying layer 31 at the first end surface 15 is, in the cross-section of FIG. 3A, the thickness of the portion of the underlying layer 31 positioned at the first end surface 15 in a direction orthogonal to the first end surface 15. As illustrated in the cross-section of FIG. 3B, the thickness T1 of the underlying layer 31 at the bottom surface 17 may be equal to the thickness T2 of the underlying layer 31 at the first end surface 15. Here, the term "equal" does not mean that it is absolutely the same, and includes, for example, a manufacturing variation and the like.

The coating film 32 covers the portion of the underlying layer 31 exposed at the element body 10. For example, the coating film 32 covers all of the protruding portion 31*a* of the underlying layer 31 and the one surface 31*b* of the underlying layer 31. The protrusion amount of the first outer electrode 30 from the first end surface 15 is smaller than the protrusion amount of the first outer electrode 30 from the bottom surface 17.

The underlying layer 31 is formed by, for example, baking a conductive paste including a conductive material such as Ag, Cu, Au, or an alloy containing these as a main component and a glass component. The coating film 32 is formed on the underlying layer 31 by a plating process, for example. The coating film 32 is formed of, for example, two layers of a Ni film and a Sn film. However, the coating film is not limited to including two layers, and may be a single layer, or include three or more layers. The Ni film covers the underlying layer 31 and prevents dissolution of metallization of the underlying layer 31. The Sn film covers the Ni film, and improves the solder wettability of the first outer electrode 30. Note that the coating film 32 may be formed by applying a conductive resin paste, for example, or may be formed by sputtering process instead of plating process.

Similarly to the first outer electrode 30, the second outer electrode 40 includes an underlying layer 41 and a coating film 42. The underlying layer 41 is embedded in the element body 10 such that part of the underlying layer 41 protrudes from the surface of the element body 10. That is, part of the underlying layer 41 (protruding portion 41*a*) protrudes from the bottom surface 17 of the element body 10. Further, one surface 41*b* of the underlying layer 41 is exposed at the second end surface 16 of the element body 10. The coating film 42 covers the portion of the underlying layer 41 exposed at the element body 10. The underlying layer 41 and the coating film 42 are formed of the same material as those of the first outer electrode 30.

According to the inductor component 1, since part of the underlying layers 31 and 41 (protruding portions 31*a* and 41*a*) protrudes from the surface of the element body 10 and the coating films 32 and 42 cover the underlying layers 31 and 41, the area in which the coating films 32 and 42 are in contact with the underlying layers 31 and 41 may be increased, and the fixing force of the coating films 32 and 42 to the underlying layers 31 and 41 is improved.

As illustrated in FIG. 4, when the inductor component 1 is mounted on the mounting substrate 51, that is, when an electronic component 50 is manufactured by connecting the inductor component 1 to the wire 51*a* of the mounting substrate 51 with the solder 52, since the surface area of the coating films 32 and 42 increases, the contact area with the solder 52 may be increased and the fixing force of the inductor component 1 to the mounting substrate 51 is improved.

Further, since part of the underlying layers 31 and 41 (protruding portions 31*a* and 41*a*) protrudes from the bottom surface 17 of the element body 10, the surface area of the coating films 32 and 42 at the bottom surface 17 of the element body 10 may be increased. Thus, when the inductor component 1 is mounted on the mounting substrate 51, the surface area of the coating films 32 and 42 facing the mounting substrate 51 may be increased and the contact area with the solder 52 may further be increased, and the fixing force of the inductor component 1 to the mounting substrate 51 is thus further improved.

Further, since part of the underlying layers 31 and 41 (protruding portions 31*a* and 41*a*) protrudes from the bottom surface 17 of the element body 10, it is possible to adopt a configuration in which the first outer electrode 30 and the second outer electrode 40 are shifted toward the bottom surface 17 of the element body 10. With this, the inner diameter of the coil 20 may be widely formed close to the bottom surface 17 of the element body 10, and it is possible to improve the efficiency of acquiring the L value and the Q factor.

Further, since part of the underlying layers 31 and 41 (protruding portions 31*a* and 41*a*) protrudes from the bottom surface 17 of the element body 10, it is possible to increase the volume of the first outer electrode 30 and the second outer electrode 40 protruding from the bottom surface 17 of the element body 10. With this, in a case where the inductor component 1 is mounted on the mounting substrate 51, when the inductor component 1 receives an impact from the outside, the first outer electrode 30 and the second outer electrode 40 may disperse the impact, and it is thus possible to improve the impact resistance. Further, since the bottom surface 17 and the underlying layers 31 and 41 (interface between the underlying layers 31 and 41 and the coating films 32 and 42) are not flush with each other, it is possible to suppress the peeling off of the coating films 32 and 42 from the interface.

Further, since part of the underlying layers 31 and 41 (protruding portions 31*a* and 41*a*) protrudes from the bottom surface 17 of the element body 10, the bottom surface of the underlying layers 31 and 41 may easily be polished by an abrasive before the coating films 32 and 42 are formed on the underlying layers 31 and 41. This makes it possible to easily perform the deburring of the underlying layers 31 and 41. Further, since the deburring of the underlying layers 31 and 41 are reliably performed, it is possible to improve the uniformity of the plating film thickness of the coating films 32 and 42. In a case where the underlying layer does not protrude from the bottom surface of the element body, there is a risk that the abrasive is in contact with the bottom surface of the element body and the bottom surface of the underlying layer may not be polished.

Further, since part of the underlying layers 31 and 41 (protruding portions 31*a* and 41*a*) protrudes from the bottom surface 17 of the element body 10, the underlying layers 31 and 41 easily contact with the medium in the barrel plating (plating process), and the coating films 32 and 42 may be easily formed by the plating process.

Further, since part of the underlying layers 31 and 41 (protruding portions 31*a* and 41*a*) protrudes from the bottom surface 17 of the element body 10, a distance L between the bottom surface 17 of the element body 10 and the mounting surface of the mounting substrate 51 may be made longer. With this, when the inductor component 1 is resin-sealed, the resin material easily enters the space between the bottom surface 17 of the element body 10 and the mounting surface of the mounting substrate 51. As described above, the easiness of resin filling is improved, and the reliability is improved. Further, as described above, since the distance L between the bottom surface 17 of the element body 10 and the mounting surface of the mounting substrate 51 may be made longer, it is possible to suppress the blocking of the magnetic flux of the coil 20 by the mounting substrate 51, and the characteristics of the inductor component 1 are improved.

Further, since the underlying layers 31 and 41 do not protrude from the surface other than the bottom surface 17 of the element body 10, it is possible to achieve both the reduction in size and the improvement of the fixing force.

Further, since the underlying layer 31 does not protrude from the first end surface 15 of the element body 10 and is exposed, it is possible to achieve both the reduction in size and the improvement of the fixing force. Note that since the underlying layer 41 does not protrude from the second end surface 16 of the element body 10 and is exposed, the same effect is obtained.

Further, since the protrusion amount of the first outer electrode 30 from the first end surface 15 is smaller than the protrusion amount of the first outer electrode 30 from the bottom surface 17, it is possible to achieve both the reduction in size and the improvement of the fixing force. Since the protrusion amount of the second outer electrode 40 from the second end surface 16 is smaller than the protrusion amount of the second outer electrode 40 from the bottom surface 17, the same effect is obtained.

Further, since the thickness T1 of the underlying layer 31 at the bottom surface 17 is larger than the thickness T2 of the underlying layer 31 at the first end surface 15, the volume of the first outer electrode 30 and the second outer electrode 40 may be increased without increasing the length of the first outer electrode 30 and the second outer electrode 40 in the longitudinal direction, and thus it is possible to achieve both the reduction in size and the improvement of impact resistance. Further, the thickness T1 of the underlying layer 31 at the bottom surface 17 may be the same as the thickness T2 of the underlying layer 31 at the first end surface 15, and in this case, the inner diameter of the coil 20 may widely be formed and it is possible to improve the efficiency of acquiring the L value and the Q factor.

Further, the electronic component 50 includes the inductor component 1 and the mounting substrate 51 on which the inductor component 1 is mounted. According to the electronic component 50, since the surface area of the coating films 32 and 42 of the inductor component 1 increases, when the inductor component 1 is mounted, with the solder 52, on the mounting substrate 51, the contact area between the solder 52 and the coating films 32 and 42 may be increased, and the fixing force of the inductor component 1 to the mounting substrate 51 is improved.

Note that the bottom surface (coating films 32 and 42) of the first outer electrode 30 and the second outer electrode 40 may have a flat surface, or may have unevenness. When the bottom surface of the first outer electrode 30 and the second outer electrode 40 have unevenness, the surface area of the bottom surface of the first outer electrode 30 and the second outer electrode 40 (coating films 32 and 42) increases. In addition, when the bottom surface of the first outer electrode 30 and the second outer electrode 40 has a dent, the solder gathers therein and the posture becomes stable.

Further, when the bottom surface 17 of the element body 10 is viewed, the bottom surface of the first outer electrode 30 and the second outer electrode 40 has a rectangular shape, but may have a T-shape, or the edge of the bottom surface of the first outer electrode 30 and the second outer electrode 40 may have a comb-tooth shape having continuous unevenness.

Manufacturing Method

A manufacturing method for the inductor component 1 is described with reference to FIG. 2.

First, a first insulating layer (corresponding to an insulating layer 11 in FIG. 2) is formed. Specifically, an insulating paste such as glass is applied to a substrate such as a carrier film, and the entire surface of the insulating paste is exposed to ultraviolet rays. The insulating layer 11 serving as a marker layer may be provided as a lowermost layer or a uppermost layer of the element body 10, and the marker layer preferably has a color different from the color of the insulating layers 11 other than the marker layer so as to detect such as the rollover of the inductor component 1 at the time of mounting.

Next, the coil conductor layer 21 is formed on the first insulating layer. Specifically, a photosensitive conductive paste is applied to the first insulating layer by printing, and the coil conductor layer 21 is formed by a photolithography method. The outer electrode conductor layers 33 and 43 are formed at the same time. The number of layers, the thickness, and the number of turns of the coil conductor layer 21 are set to a desired value according to the L value to be obtained.

Subsequently, a second insulating layer (corresponding to an insulating layer 11 in FIG. 2) is formed on the coil conductor layer 21. Specifically, the second insulating layer having a via hole and an outer electrode groove is formed on the coil conductor layer 21 by the photolithography method or the like. After that, by forming the coil conductor layer 21 and the outer electrode conductor layers 33 and 43 on the second insulating layer again, the via hole and the outer electrode groove are filled with the conductive paste. The coil conductor layers 21 adjacent to each other in the lamination direction A are connected, and the outer electrode conductor layers 33 adjacent to each other in the lamination direction A are connected, and the outer electrode conductor layers 43 adjacent to each other in the lamination direction A are connected. Note that, there may be an insulating layer 11 where the coil conductor layer 21 is not provided depending on the setting of the number of layers of the coil conductor layer 21. In that case, the via hole is not formed and the outer electrode groove alone is formed in the shape following the shape of the outer electrode.

Further, extended conductor layers are connected to at least the lowermost layer and the uppermost layer of the coil conductor layer 21, and are connected to the outer electrode conductor layers 33 and 43 which are opposite to each other, respectively. It is preferable that the shape of the coil 20 have a 180° rotational symmetricity so as not to be affected by the directivity of a product.

The above-described steps are repeated to laminate the plurality of insulating layers 11, the plurality of coil conductor layers 21, and the plurality of outer electrode conductor layers 33 and 43. Subsequently, the multilayer body is cut with a dicing machine, guillotine shearing machine, or the like, and is divided into individual pieces. The divided multilayer body is fired to be formed in a desired size. Here, by making the shrinkage ratio of the outer electrode conductor layers 33 and 43 smaller than the shrinkage ratio of the insulating layer 11, the shrinkage ratio of the element body 10 becomes larger than the shrinkage ratio of the outer electrode conductor layers 33 and 43 by firing, and control is performed such that part of the outer electrode conductor layers 33 and 43 (underlying layers 31 and 41) protrudes from the bottom surface 17 of the element body 10.

Subsequently, the inductor component 1 is manufactured such that Ni, Cu, Sn, or the like is plated on the exposed portion of the outer electrode conductor layers 33 and 43 at the element body 10, and the coating films 32 and 42 are formed. Note that although the photolithography method is described in the above, a lamination method, a semi-additive method, or the like may be adopted and the methods are not limited.

Second Embodiment

Figure 5:
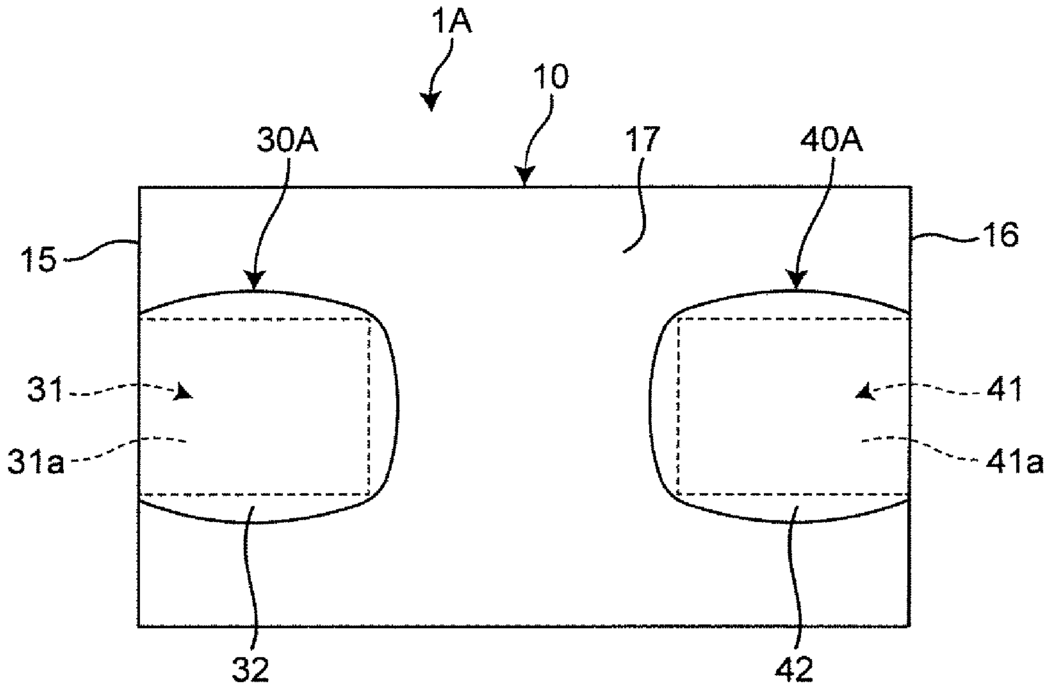
FIG. 5 is a bottom view illustrating a second embodiment of the inductor component.

FIG. 5 is a bottom view illustrating a second embodiment of the inductor component. The second embodiment is different from the first embodiment in the configuration of the outer electrodes. This different configuration is described below. The other configurations are the same as those in the first embodiment, and the same reference numerals as in the first embodiment are given and description thereof is omitted.

As illustrated in FIG. 5, as for an inductor component 1A of the second embodiment, in a first outer electrode 30A, when viewed from the bottom surface 17 of the element body 10, the interface between the underlying layer 31 (protruding portion 31*a*) and the element body 10 is covered by the coating film 32. That is, in the first outer electrode 30A, the outer peripheral edge of the coating film 32 is positioned outside the outer peripheral edge of the underlying layer 31 (protruding portion 31*a*) when viewed from the bottom surface 17 of the element body 10.

Similarly, in a second outer electrode 40A, when viewed from the bottom surface 17 of the element body 10, the interface between the underlying layer 41 (protruding portion 41*a*) and the element body 10 is covered by the coating film 42. That is, in the second outer electrode 40A, the outer peripheral edge of the coating film 42 is positioned outside the outer peripheral edge of the underlying layer 41 (protruding portion 41*a*) when viewed from the bottom surface 17 of the element body 10.

According to the inductor component 1A, since the interface between the underlying layers 31 and 41 and the element body 10 is covered by the coating films 32 and 42, the surface area of the coating films 32 and 42 may be increased, and the strength against bending of the element body 10 may be improved. In addition, it is possible to prevent moisture from entering between the underlying layers 31 and 41 and the element body 10 from the outside of the element body 10. Further, the contact area with the solder 52 may be further increased and the fixing force of the inductor component 1A to the mounting substrate 51 may be further improved.

Third Embodiment

Figure 6:
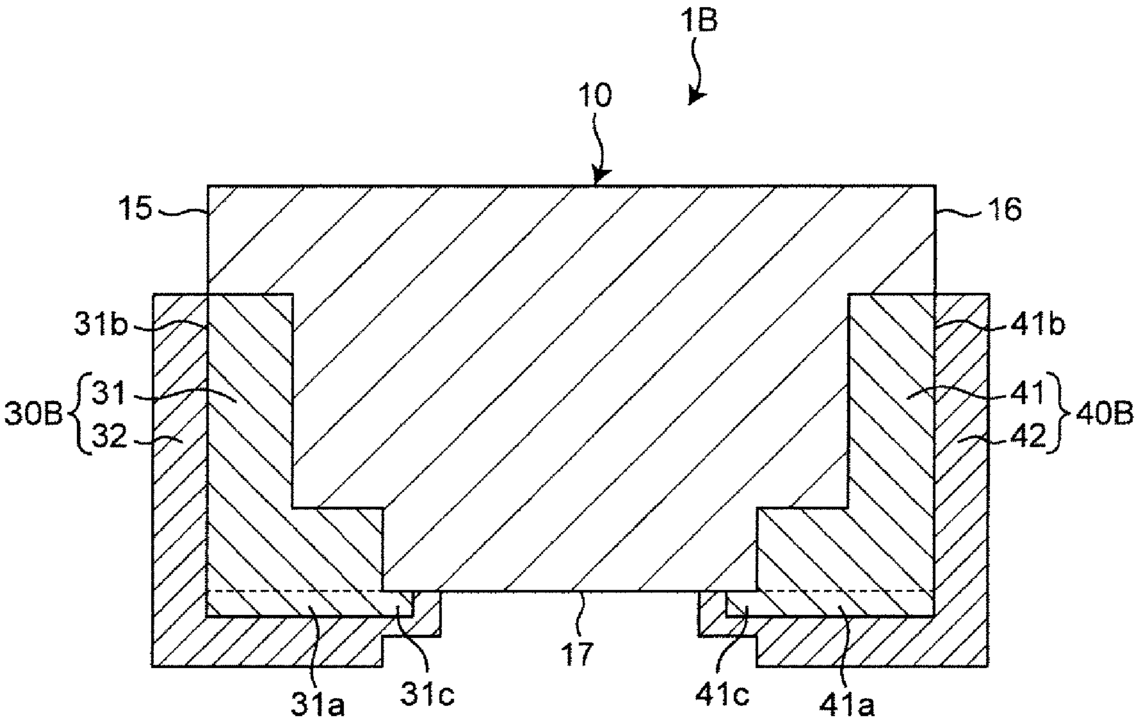
FIG. 6 is a sectional view illustrating a third embodiment of the inductor component.

FIG. 6 is a sectional view illustrating a third embodiment of the inductor component. The third embodiment is different from the first embodiment in the configuration of the outer electrodes. This different configuration is described below. The other configurations are the same as those in the first embodiment, and the same reference numerals as in the first embodiment are given and description thereof is omitted.

As illustrated in FIG. 6, as for an inductor component 1B of the third embodiment, in a first outer electrode 30B, part of the underlying layer 31 (protruding portion 31*a* of underlying layer 31) protruding from the bottom surface 17 of the element body 10 includes an overhanging portion 31*c* that overhangs on the bottom surface 17 of the element body 10 and covers the bottom surface 17 of the element body 10. The overhanging portion 31*c* protrudes toward a second outer electrode 40B. The overhanging portion 31*c* may be provided to the underlying layer 31 in the entire length along the axial direction of the coil 20 (along the direction from front to back of the paper), or may be provided to the underlying layer 31 in part of the entire length. Similarly, in the second outer electrode 40B, the protruding portion 41*a* of the underlying layer 41 includes an overhanging portion 41*c* that overhangs on the bottom surface 17 of the element body 10 and covers the bottom surface 17 of the element body 10.

According to the inductor component 1B, since the protruding portions 31*a* and 41*a* of the underlying layers 31 and 41 include the overhanging portions 31*c* and 41*c*, the volume of the portion of the outer electrodes 30B and 40B protruding from the element body 10 may be increased, and the strength of the inductor component 1B against bending may further be improved.

Fourth Embodiment

Figure 7:
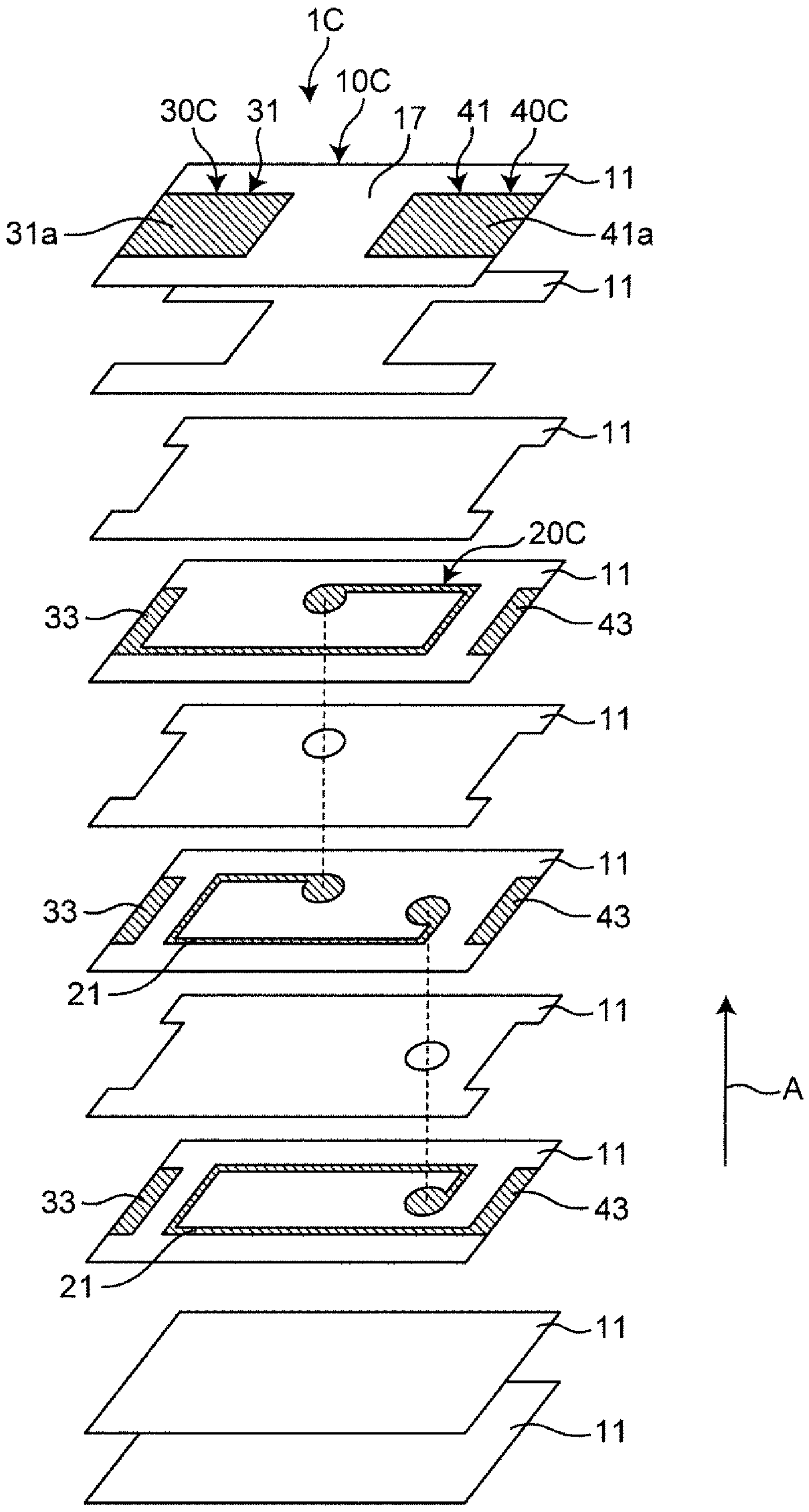
FIG. 7 is an exploded perspective view illustrating a fourth embodiment of the inductor component.

FIG. 7 is an exploded perspective view illustrating a fourth embodiment of the inductor component. The fourth embodiment is different from the first embodiment in the configuration of the element body, the outer electrode, and the coil. This different configuration is described below. The other configurations are the same as those in the first embodiment, and the same reference numerals as in the first embodiment are given and description thereof is omitted.

As illustrated in FIG. 7, in an inductor component 1C of the fourth embodiment, an element body 10C includes the plurality of insulating layers 11 laminated in the lamination direction A, and the uppermost insulating layer 11 in FIG. 7 constitutes the bottom surface 17 of the element body 10C. The coil conductor layer 21 constituting a coil 20C, the outer electrode conductor layer 33 constituting a first outer electrode 30C, and the outer electrode conductor layer 43 constituting a second outer electrode 40C are provided on a predetermined insulating layer 11.

With this, the axis of the coil 20C is orthogonal to the bottom surface 17 of the element body 10C, and the coil 20C has a longitudinal winding structure. The protruding portion 31*a* of the underlying layer 31 of the first outer electrode 30C is formed on the uppermost insulating layer 11, and protrudes from the bottom surface 17 of the element body 10C. The protruding portion 41*a* of the underlying layer 41 of the second outer electrode 40C is formed on the uppermost insulating layer 11, and protrudes from the bottom surface 17 of the element body 10C.

At this time, as a method for forming the protruding portions 31*a* and 41*a*, a region where the protruding portions 31*a* and 41*a* are not formed may be masked with a sheet or the like. Alternatively, a seed layer is formed in a region where the protruding portions 31*a* and 41*a* are to be formed, and the protruding portions 31*a* and 41*a* may be formed by plating deposition. The methods of forming the protruding portions 31*a* and 41*a* are not limited to the above, and other methods may be employed.

According to the inductor component 1C, as in the first embodiment, since part of the underlying layers 31 and 41 (protruding portions 31*a* and 41*a*) protrudes from the surface of the element body 10 and the coating films 32 and 42 cover the protruding underlying layers 31 and 41, the area in which the coating films 32 and 42 are in contact with the underlying layers 31 and 41 may be increased, and the fixing force of the coating films 32 and 42 to the underlying layers 31 and 41 is improved.

It should be noted that the present disclosure is not limited to the above-described embodiments, and design changes may be made without departing from the gist of the present disclosure. For example, the features of the first to fourth embodiments may be variously combined with each other.

In the embodiments, the underlying layer of the outer electrode protrudes from the bottom surface of the element body. However, the underlying layer may protrude from the end surface of the element body instead of the bottom surface of the element body, or may protrude from the bottom surface and the end surface of the element body.

In the embodiments, when viewed from the bottom surface of the element body, the outer peripheral edge of the coating film is positioned on the outer peripheral edge of the underlying layer or outside the outer peripheral edge of the underlying layer. However, at least part of the outer peripheral edge of the coating film may be positioned inside the outer peripheral edge of the underlying layer, thereby ensuring a sufficient distance between the adjacent outer electrodes.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:
an element body having an end surface and a bottom surface;
a coil provided in the element body; and
an outer electrode provided to the element body and electrically connected to the coil, wherein
the outer electrode includes
an underlying layer embedded in the element body, in a view of the bottom surface of the element body, the underlying layer extends away from the end surface to an innermost edge, and
a coating film covering a portion of the underlying layer exposed at the element body, and
the coating film includes an outer peripheral edge, and the outer peripheral edge extends further from the end surface of the element body than the innermost edge of the underlying layer, and the outer peripheral edge has a convex surface in the view of the bottom surface of the element body.

2. The inductor component according to claim 1, wherein
the bottom surface of the element body faces a mounting substrate when the element body is mounted, and
part of the underlying layer protrudes from the bottom surface.

3. The inductor component according to claim 2, wherein
the underlying layer does not protrude from a surface other than the bottom surface of the element body.

4. The inductor component according to claim 3, wherein
the end surface of the element body intersects with the bottom surface of the element body, and
the underlying layer does not protrude from the end surface and is exposed.

5. The inductor component according to claim 2, wherein
a protruding amount of the outer electrode from the end surface of the element body is smaller than a protruding amount of the outer electrode from the bottom surface of the element body.

6. The inductor component according to claim 1, wherein
the coating film has four sides in the view of the bottom surface of the element body, and
the outer peripheral edge of the coating film corresponds to three of the four sides of the coating film and is outside an outer peripheral edge of the underlying layer.

7. The inductor component according to claim 1, wherein
the coating film covers an entirety of the underlying layer in the view of the bottom surface of the element body, and
the outer peripheral edge of the coating film is outside an outer peripheral edge of the underlying layer.

8. An inductor component comprising:
an element body;
a coil provided in the element body; and
an outer electrode provided to the element body and electrically connected to the coil, wherein
the outer electrode includes
an underlying layer embedded in the element body such that part of the underlying layer protrudes from a surface of the element body, and
a coating film covering a portion of the underlying layer exposed at the element body,
part of the underlying layer protruding from a surface of the element body includes an overhanging portion on the surface of the element body, and
a covering portion of the coating film that covers the overhanging portion includes a recessed portion.

9. The inductor component according to claim 8, wherein
the underlying layer does not protrude from a surface other than a bottom surface of the element body.

10. The inductor component according to claim 9, wherein
the element body includes an end surface intersecting with the bottom surface of the element body, and
the underlying layer does not protrude from the end surface and is exposed.

11. The inductor component according to claim 9, wherein
a protruding amount of the outer electrode from an end surface of the element body is smaller than a protruding amount of the outer electrode from the bottom surface of the element body.

12. An inductor component comprising:
an element body;
a coil provided in the element body; and
an outer electrode provided to the element body and electrically connected to the coil, wherein
the element body includes a plurality of insulating layers,
the coil includes a plurality of coil conductor layers wound on the insulating layers laminated in a direction parallel to a bottom surface of the element body, and the coil conductor layers are not rotationally symmetric; and
the outer electrode includes
an underlying layer embedded in the element body, and
a coating film covering a portion of the underlying layer exposed at the element body, and
a thickness of the underlying layer at the bottom surface is larger than a thickness of the underlying layer at an end surface of the element body.

13. The inductor component according to claim 12, wherein
the bottom surface of the element body faces a mounting substrate when the element body is mounted, and
part of the underlying layer protrudes from the bottom surface.

14. The inductor component according to claim 13, wherein
the underlying layer does not protrude from a surface other than the bottom surface of the element body.

15. The inductor component according to claim 14, wherein
the end surface of the element body intersects with the bottom surface of the element body, and
the underlying layer does not protrude from the end surface and is exposed.

16. The inductor component according to claim 13, wherein
a protruding amount of the outer electrode from the end surface of the element body is smaller than a protruding amount of the outer electrode from the bottom surface of the element body.

17. The inductor component according to claim 12, wherein the underlying layer, in a view of the bottom surface of the element body, extends away from the end surface to an innermost edge, and the coating film includes an outer peripheral edge, and the outer peripheral edge extends further from the end surface of the element body than the innermost edge of the underlying layer, and the outer peripheral edge has a convex surface in the view of the bottom surface of the element body.

18. The inductor component according to claim 12, wherein the coating film has four sides in a view of the bottom surface of the element body, and an outer peripheral edge of three of the four sides of the coating film is outside an outer peripheral edge of the underlying layer, and has a convex surface in the view of the bottom surface of the element body.

19. The inductor component according to claim 12, wherein the coating film covers an entirety of the underlying layer in a view of the bottom surface of the element body, and an outer peripheral edge of the coating film is outside an outer peripheral edge of the underlying layer and has a convex surface in the view of the bottom surface of the element body.

* * * * *